Aug. 8, 1950     C. W. SHAW     2,518,387
RELIEF VALVE
Filed Nov. 3, 1944
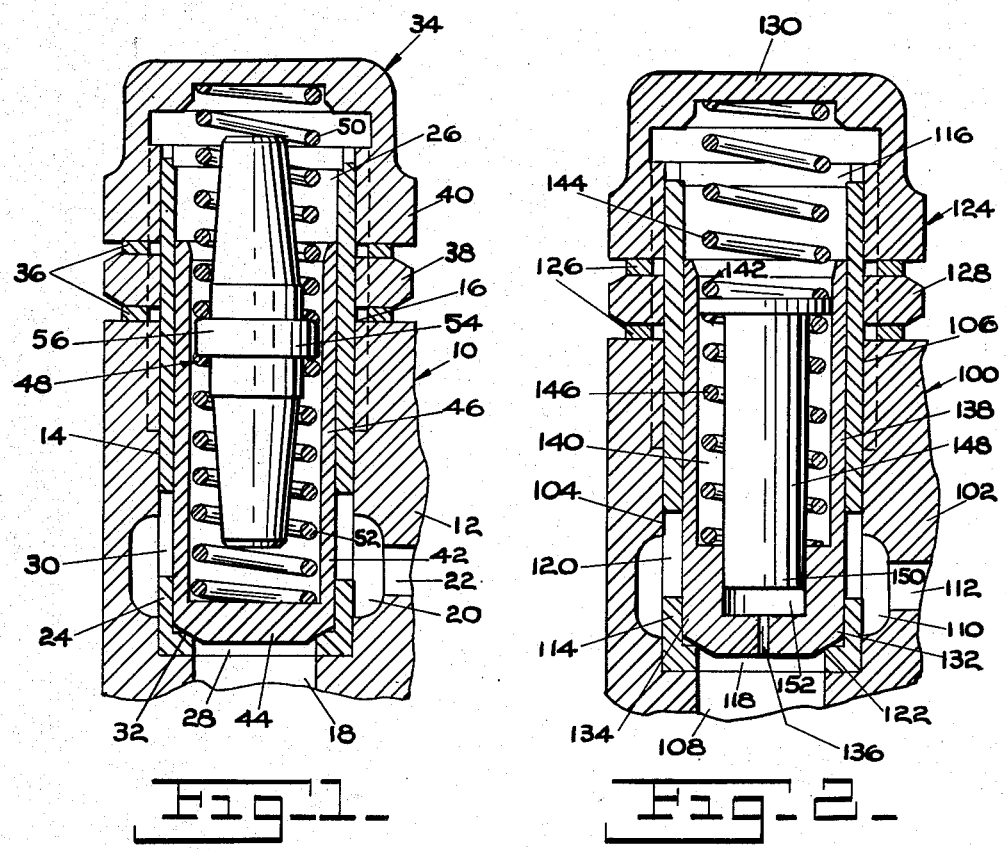
INVENTOR.
CLARENCE W. SHAW
BY Joseph F. Teagno
ATTORNEY Patented Aug. 8, 1950

2,518,387

UNITED STATES PATENT OFFICE 2,518,387

RELIEF VALVE

Clarence W. Shaw, Grosse Pointe, Mich., assignor to Eaton Manufacturing Company, Cleveland, Ohio, a corporation of Ohio Application November 3, 1944, Serial No. 561,671

5 Claims. (Cl. 137—53)

This invention relates to valves and more particularly to fluid pressure relief valves.

Broadly the invention comprehends a relief valve having damper means incorporated therein for reducing spring vibration and thus eliminate spring breakage.

Heretofore no means have been adapted to eliminate the high percentage of breakage experienced in the springs employed to control relief valve plungers, and it is the premise of the instant invention to remedy this situation.

An object of this invention is to provide means for eliminating spring breakage in relief valves.

Another object of the invention is the provision of means for damping the spring vibration in relief valves so as to eliminate spring breakage.

Another object of the invention is to provide a spring pressed relief valve having means for reducing the spring frequency.

A further object of the invention is to provide a spring pressed valve with a spring system, said spring system being made out of resonance with the excitation frequency.

A still further object of the invention is to provide a relief valve with a spring having a centrally added mass for reducing the spring frequency and thus eliminate spring breakage.

A yet further object of the invention is to provide a spring pressed relief valve with means incorporated therein for damping the spring vibration and for preventing chattering or pounding of the valve.

Other objects and advantages of the invention will appear from the following description taken in connection with the drawing, forming a part of the specification; and in which:

Figure 1 is a vertical sectional view of a relief valve incorporating a preferred embodiment of my invention; and Figure 2 is a vertical sectional view of a relief valve incorporating a modification of my invention.

It is the customary practice in the manufacture of relief valves to spring press the valves to the pressure at which it is desired to relieve pressure from the mechanism with which they are associated. Repeated failure of the springs so employed has necessitated a spring system construction as evidenced by the instant invention so as to alleviate this condition.

The spring breakage heretofore experienced is believed to have been due to the motor action of the valve wherein the excitation frequency of the valve approaches the natural frequency of the spring. This condition can be eliminated in several ways; but the only practical solution is to reduce the spring frequency to substantially one half its normal frequency. Ordinarily the reducing of the frequency as here proposed would introduce problems of excessive spring space requirements; but by the present teaching, the frequency of the spring system can be readily reduced to one half the original by adding a weight of approximately three times the active weight of the spring intermediate the length of the spring or between two identical springs, adding up to a single spring, without requiring any additional space. In so making the fundamental frequency of the spring system out of resonance with the excitation frequency, the natural frequency of the spring system is made approximately one-half of the original spring.

In addition to eliminating spring breakage the present invention provides a modified form of relief valve wherein provision is made for prevention of valve chatter or flutter. This flutter preventative means is in the form of a fluid pressure cushioning chamber having a restricted port for the limited egress of fluid from the pressure chamber as the valve plunger moves off its seat.

Referring to Figure 1 for more specific details of the preferred embodiment of the invention, 10 represents generally a relief valve having a housing 12 provided with a coaxial bore 14 therein. The bore 14 extends the length of the housing and has an open end 16 for the reception of valve mechanism to be described and a ported end 18 providing communication with the mechanism (not shown) with which the valve is to be associated. The housing 12 forming a part of the mechanism has an annular groove 20 associated with the bore and an outlet port 22 communicating with the annular groove.

A cylinder 24 received by the bore 20 and fixedly secured therein has an open end 26 and a ported end 28 in concentric relation with ported end 18 of the housing. A plurality of openings 30 in the wall of the cylinder register with annular groove 20 of the housing to thus provide communication between the interior of the cylinder and groove 20. The ported end 28 of the cylinder provides a valve seat 32.

A cap assembly 34 slipped over the cylinder 24 includes a pair of gaskets 36, a lock nut 38, and a cap 40 threaded on the end of the cylinder, said cap being adjustable, the purpose of which will hereinafter appear.

Reciprocably mounted in the cylinder 24 is a plunger valve 42 comprising a head 44 and a cylindrical portion 46. The head 44 of the plunger cooperates with valve seat 32 to provide sealing engagement therewith.

The plunger valve is urged to closed position with the head 44 seating on valve seat 32 by a spring system 48, the pressure of said spring system being predetermined to the pressure at which it is desired to effect fluid pressure relief. The cap 40 is capable of adjustment to vary the spring loading pressure as conditions may require.

The spring system as shown by Figure 1 comprises springs 50 and 52 having interposed therebetween a member 54. Spring 50 has one end thereof abutting the inner portion of cap 40 and the other end bearing on a flange 56 provided on member 54 whereas the spring 52 has one end abutting the inner portion of head 44 of the plunger and the other end bearing on the flange 56 opposing spring 50. The member 54, the greater portion of spring 50, and all of spring 52 are disposed within the cylindrical portion 46 of plunger 42 to be guided thereby.

The springs 50 and 52 are identical in all respects such that upon actuation of plunger 42 they will equally respond to the compressive load exerted thereupon. The member 54 is made approximately three times the active weight of an original spring (wherein springs 50 and 52 replace a single spring of like length, weight, and size) for the purpose of reducing the natural frequency of the spring system to approximately one half that of the original spring.

Although the spring system 48 is herein illustrated and described as comprising a pair of springs 50 and 52 having a member 54 intermediate the springs of sufficient mass to change the spring frequency of the spring set 50—52, it is obvious that a single spring of equal length, size, and weight of the springs 50 and 52 combined, having a member the equivalent of member 54 intermediate its length, would be interchangeable with spring system 48 to perform an identical function. Spring system 48 is shown and defined inasmuch as it provides for facility of manufacture as compared to a single spring structure which might replace it.

By so reducing the natural frequency of the spring system to thus take it out of resonance with the plunger frequency, the life of the spring system is prolonged as compared to a single spring occupying a like space and having a natural frequency in resonance with the plunger. It is to be realized that the plunger as here employed is one having a substantially constant natural frequency such that the frequency of the spring system is changed therefrom an amount sufficient such that the frequency of the spring system will never attain resonance with the plunger frequency.

The plunger frequency herein is synonymous with excitation frequency as a standard to which the spring system is established with sufficient variance to keep the excitation frequency and spring system frequency out of resonance.

In a normal operation of the relief valve, fluid under pressure from the inlet passage 18 passes through port 28 and impinges on the head 44 of the plunger thus subjecting the plunger to a lifting force in an amount determined by the pressure of the fluid and the area exposed thereto. As the fluid pressure acting on head 44 reaches the spring system pressure the plunger valve is lifted from its seat thus allowing fluid under pressure to bypass the valve, around the plunger through openings 30 in the cylinder, and annular groove 20 to outlet port 22. Variations of fluid pressure slightly above and below the spring pressure tend to vibrate the plunger until such time as it operates at its natural frequency due to falling and rising of the fluid pressure. With the plunger operating at natural frequency due to this motor action of the valve induced by fluid pressure variance the spring system functions perfectly and without chance of failure because it is not in resonance with the plunger. With a drop in pressure below the predetermined pressure rating of the spring system the plunger seats itself on the valve seat and confines the pressure to the operating mechanism associated with the valve until such time as the pressure again exceeds the spring force.

In the modified form of the invention as shown by Figure 2, 100 represents generally a relief valve having a housing 102 provided with a coaxial bore 104 therein. The bore 104 extends the length of the housing and has an open end 106 for the reception of valve mechanism to be described and a ported end 108 providing communication with the mechanism (not shown) with which the valve is to be associated. The housing 102 forming a part of the mechanism has an annular groove 110 associated with the bore and an outlet port 112 communicating with the annular groove.

A cylinder 114 received by the bore 110 and fixedly secured therein has an open end 116 and a ported end 118 in concentric relation with ported end 108 of the housing. A plurality of openings 120 in the wall of the cylinder register with annular groove 110 of the housing to thus provide communication between the interior of the cylinder and groove 110. The ported end 108 of the cylinder provides a valve seat 122.

A cap assembly 124 slipped over the cylinder 114 includes a pair of gaskets 126, a washer 128, and a cap 130 threaded on the end of the cylinder, said cap being adjustable, the purpose of which will hereinafter appear.

A plunger valve 132 reciprocably mounted in the cylinder 114 comprises a head 134, having a restricted passage 136 therethrough, and a cylindrical body portion 138 having a concentric stepped bore 140 communicating with the passage 136. The head 134 of the plunger cooperates with valve seat 122 to provide sealing engagement therewith.

The plunger valve is urged to closed position by spring system 142. The spring system includes springs 144 and 146 and piston plunger 148 interposed between the springs. Piston plunger 148 although similar to member 52 of the preferred embodiment of the invention in providing mass for the spring, additionally has a head 150 reciprocable in a chamber 152 provided between the piston 148 and a portion of bore 140. Chamber 152 acts as a cushioning chamber between the valve plunger 132 and piston 148 such that as pressure acts upon head 134 of valve plunger 132 to move it from its seat a cushioning effect is afforded by the piston head moving in chamber 152 and forcing fluid through the restricted passage 136 in the head of the plunger. In this manner chamber 152 acts as a cushioning means to prevent sudden movement of the plunger valve in an opening direction so that chattering or pounding of the valve is prevented. Likewise, if the spring tends to surge or vibrate at frequency different from the frequency of valve 132, movement of the piston 148 in chamber 152 will cause a valve dampening action.

When the pressure in the inlet line is reduced below a predetermined degree, the spring system tends to force the plunger valve toward its closed position resting on valve seat 122. During this closing movement of the plunger valve, a partial vacuum is created in chamber 152 since the restricted passage 136 retards flow of fluid from the valve inlet port to the chamber. Thus pounding, chattering, or fluttering of the plunger valve on its seat is prevented.

Aside from this operational characteristic of the relief valve shown by Figure 2, the operation bearing on the relative normal frequencies of the plunger and spring system is identical to the structure disclosed by Figure 1.

While this invention has been described in connection with certain specific embodiments, the principle involved is susceptible of numerous other applications that will readily occur to persons skilled in the art. The invention is, therefore, limited only as indicated by the scope of the appended claims.

What I claim is:

1. A valve comprising a housing having inlet and outlet passages, a plunger reciprocable in the housing arranged to control flow between the passages, said plunger being provided with a restricted passage in the head thereof and having a substantially constant natural frequency of vibration, a spring normally urging the plunger to closed position, and a weighted member affixed to the spring intermediate the length of the spring and cooperating with the plunger to provide a fluid compression chamber therebetween communicating with the restricted passage in the plunger.

2. A valve comprising a housing having inlet and outlet passages, a plunger reciprocable in the housing arranged to control flow between the passages, said plunger being provided with a restricted passage in the head thereof and having a substantially constant natural frequency of vibration, a spring normally urging the plunger to closed position, and a piston affixed intermediate the length of the spring and having a part reciprocable within the plunger and providing therewith a fluid compression chamber having the restricted passage as a fluid inlet and outlet.

3. In a valve embodying a housing with a valve seat therein, a valve reciprocable in the housing having a head and a hollow cylindrical body, said valve having a restricted passage in the head thereof, a pair of identical springs normally urging the head of the valve to the valve seat and a piston interposed between the springs and having a part reciprocable in said hollow cylindrical body and cooperating therewith to provide a fluid compression chamber communicating with the passage in the head of the valve.

4. In a relief valve embodying a casing having a substantially cylindrical chamber therein with inlet and outlet ports communicating therewith, a valve seat formed in the inlet port, a valve having a part engaging the valve seat, said part having a restricted passage therethrough, a hollow stem on the valve having a stepped bore, a piston reciprocable in the smaller portion of the bore of the stem providing a compression chamber therebetween communicating with the restricted passage, and a spring system normally urging the valve to its seat and supporting the piston medially of the length of said spring system.

5. A valve comprising a housing having inlet and outlet passages, a plunger reciprocable in the housing arranged to control flow between the passages, said plunger being provided with a restricted passage in the head thereof and having a substantially constant natural frequency of vibration, a spring normally urging the plunger to closed position, and a weighted member mounted on the spring and cooperating with the plunger to provide a fluid compression chamber therebetween communicating with the restricted passage in the plunger.

CLARENCE W. SHAW.

REFERENCES CITED

The following references are of record in the file of this patent:

UNITED STATES PATENTS

| Number | Name | Date |
|---|---|---|
| 1,461,933 | Pierce | July 17, 1923 |
| 1,742,755 | Cataline | Jan. 7, 1930 |
| 1,746,220 | Manning | Feb. 4, 1930 |
| 1,927,153 | Conrader | Sept. 19, 1933 |
| 2,305,519 | Dunmire | Dec. 5, 1942 |

FOREIGN PATENTS

| Number | Country | Date |
|---|---|---|
| 153,070 | Great Britain | Oct. 26, 1920 |